(12) United States Patent
Pompeani et al.

(10) Patent No.: US 10,769,405 B2
(45) Date of Patent: Sep. 8, 2020

(54) ELECTRONIC CARD COMPRISING A FINGERPRINT SENSOR AND METHOD OF MANUFACTURING SUCH A CARD

(71) Applicant: IDEMIA IDENTITY & SECURITY FRANCE, Issy les Moulineaux (FR)

(72) Inventors: Sylvie Pompeani, Issy les Moulineaux (FR); Francois Germain, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 126 days.

(21) Appl. No.: 16/038,090

(22) Filed: Jul. 17, 2018

(65) Prior Publication Data
US 2019/0019005 A1  Jan. 17, 2019

(30) Foreign Application Priority Data
Jul. 17, 2017 (FR) ...................... 17 56763

(51) Int. Cl.
*G06K 9/00* (2006.01)
*G06K 19/18* (2006.01)
(Continued)

(52) U.S. Cl.
CPC ......... *G06K 9/00053* (2013.01); *G06K 9/209* (2013.01); *G06K 19/0718* (2013.01);
(Continued)

(58) Field of Classification Search
CPC ............... G06K 9/00053; G06K 9/209; G06K 19/0718; G06K 19/07701; G06K 19/07747; G06K 19/18
See application file for complete search history.

(56) References Cited

U.S. PATENT DOCUMENTS 9,672,403 B2 * 6/2017 Tuneld ................ G06K 9/0002
9,773,153 B1 * 9/2017 Slottner ............ G06K 9/00087
(Continued)

FOREIGN PATENT DOCUMENTS

| EP | 3159832 A1 | 4/2017 |
| WO | 2009/140968 A1 | 11/2009 |
| WO | 2017/093514 A1 | 6/2017 |

OTHER PUBLICATIONS

Shigematsu et al., "A Single-Chip Fingerprint Sensor and Identifier", IEEE Journal of Solid-State Circuits, vol. 34, No. 12, Dec. 1999, pp. 1852-1859.
(Continued)

*Primary Examiner* — Utpal D Shah
(74) *Attorney, Agent, or Firm* — Womble Bond Dickinson (US) LLP

(57) ABSTRACT

The invention relates to a flexible electronic card comprising:
- a card body (1) comprising an upper surface (11) and a lower surface (12);
- at least one cavity (13, 13') formed in the card body emerging from the upper surface;
- a fingerprint module (2) configured to acquire a fingerprint of a user, the fingerprint module being housed in the cavity (13) and flush with the upper surface of the card body; the fingerprint module (2) comprising a flexible substrate (22) comprising an active part (21), designated capture part, flush with the upper surface of the card body and a microcontroller (23) arranged below the substrate.

15 Claims, 5 Drawing Sheets

(51) Int. Cl.
*G06K 9/20* (2006.01)
*G06K 19/07* (2006.01)
*G06K 19/077* (2006.01)

(52) U.S. Cl.
CPC . *G06K 19/07701* (2013.01); *G06K 19/07747* (2013.01); *G06K 19/18* (2013.01)

(56) References Cited

U.S. PATENT DOCUMENTS

| | | | | |
|---|---|---|---|---|
| 2005/0139685 | A1* | 6/2005 | Kozlay | G06K 19/07354 235/492 |
| 2006/0097059 | A1 | 5/2006 | Miyazaki | |
| 2009/0153297 | A1* | 6/2009 | Gardner | G06K 9/00026 340/5.83 |
| 2016/0140379 | A1* | 5/2016 | Pedersen | G06K 9/00919 726/19 |
| 2016/0171271 | A1* | 6/2016 | Lundahl | G06K 9/0002 382/124 |
| 2016/0358008 | A1* | 12/2016 | Lundahl | G03F 7/16 |
| 2017/0116505 | A1* | 4/2017 | Suwald | G06K 9/00013 |
| 2018/0174018 | A1* | 6/2018 | Lundberg | G06K 9/0002 |

OTHER PUBLICATIONS

Preliminary Research Report and Written Opinion received for French Application No. 1756763, dated May 18, 2018, 9 pages (1 page of French Translation Cover Sheet and 8 pages of original document).

* cited by examiner

ELECTRONIC CARD COMPRISING A FINGERPRINT SENSOR AND METHOD OF MANUFACTURING SUCH A CARD

GENERAL TECHNICAL FIELD

The invention relates to the field of electronic cards and the manufacture of such cards and more particularly relates to electronic cards comprising a fingerprint sensor.

PRIOR ART

Electronic cards comprising a fingerprint sensor are known.

The current trend is that these electronic cards, with a fingerprint sensor, are as flexible as normal chip cards while respecting as best as possible the constraints in terms of dimensions. These flexibility and dimensional constraints are mentioned in the ISO 781 ID1, ISO 7816 (for bank applications) and ISO 10373 standards.

One problem is that fingerprint sensors are fragile and cannot necessarily support such flexibility and dimensional requirements.

In order to attempt to resolve this problem, a certain number of electronic cards have been envisaged. These cards propose either increasing the rigidity of the card by increasing the thickness of the card (see document WO 2009/140968) or introducing reinforcement elements into the card at the level of the fingerprint sensor (see document WO 2017/093514).

Another problem with these cards is that the fingerprint sensor requires that some of its components (typically the processor and/or the memory) are mounted within an inlay layer between the two plastic layers of the card.

These solutions are however not satisfactory because the electronic card is complex to manufacture and the flexibility and dimensional constraints of the ISO 7816 standard are not respected.

DESCRIPTION OF THE INVENTION

One aim of the invention is to have an electronic card comprising a fingerprint sensor that satisfies the constraints specified in the ISO 781 ID1, ISO 7816 (for bank applications) and ISO 10373 standards in terms of dimensions and flexibility.

Another aim of the invention is to have a method of manufacturing an electronic card comprising a fingerprint sensor which is simple to implement.

To this end, the invention proposes a flexible electronic card comprising:
- a card body comprising an upper surface and a lower surface;
- at least one cavity formed in the card body emerging from the upper surface;
- a fingerprint module configured to acquire a fingerprint of a user, the fingerprint module being housed in the cavity and flush with the upper surface of the card body; the fingerprint module comprising a flexible substrate comprising an active part, designated capture part, flush with the upper surface of the card body and a microcontroller arranged below the substrate.

A fingerprint module flush with the upper surface of the card body has advantages of ergonomics, ease of manufacture, strength and lifetime of the card that it equips compared to a fingerprint module that would be projecting or conversely in a recess with respect to the upper surface of the card body.

Indeed, a fingerprint module that would be projecting with respect to the upper surface would introduce difficulties, or even an impossibility, of introducing the card into terminals, for example into automatic cash dispensers.

Furthermore, a fingerprint module that would be in a recess with respect to the upper surface would weaken the structure of the card and would complicate the large scale manufacture thereof. The lifetime of the card would also be reduced by the accumulation of impurities and dust in the interstice between the upper surface and the fingerprint module, which would damage the device over time.

Finally, a fingerprint module flush with the upper surface of the card makes it possible to optimise the comfort of a user positioning his finger on the fingerprint module, the user not feeling a projection or a recess under this finger when he positions it.

The invention is advantageously completed by the following characteristics, taken alone or in any technically possible combination thereof.

The fingerprint module further comprises connection pads intended to connect said fingerprint module to an antenna or to a second module.

The cavity has a maximum depth such that the distance between the lower surface of the card body and the bottom of the cavity is greater than or equal to 160 µm.

The cavity has a three-dimensional inner profile so as to follow the inner contour of the fingerprint module, the cavity comprising at least one stop configured to limit deformations of the module housed in the cavity.

The card comprises two cavities, one cavity housing the fingerprint module, the other cavity housing a second module, typically bank or access.

The card body comprises an intermediate layer, designated interconnection layer, made of conductor material on which an antenna is integrated.

The card body comprises an intermediate layer, designated interconnection layer, made of semiconductor material on which a circuit, configured to connect the fingerprint module to the second module.

The card comprises hollowing-outs formed from the at least one cavity to the interconnection layer.

The card body comprises from the upper surface to the lower surface the following laminated layers:
- a transparent protective upper layer;
- a first substrate made of PVC;
- the interconnection layer, designated intermediate layer;
- a second substrate made of PVC;
- a transparent protective lower layer.

The card further comprises a tactile mark and/or an alignment mark arranged on the upper surface of the card body near to the fingerprint module, said tactile mark being configured to enable correct positioning of a finger on the fingerprint module.

According to a second aspect, the invention also relates to a method of manufacturing an electronic card according to the invention, comprising the steps of:
- obtaining a card body;
- forming at least one cavity in said card body;
- placing a fingerprint module in the cavity, the fingerprint module comprising a flexible substrate comprising an active part, designated capture part, flush with the upper surface of the card body and a microcontroller arranged below the substrate.

The step of obtaining the card body comprises a sub-step of integrating an antenna on the intermediate layer.

The method further comprises obtaining two cavities in the card body, and placing the fingerprint module in one of the two cavities and placing a second module in the other cavity, the step of obtaining the card body further comprises a step of integrating a connection circuit configured to connect the fingerprint module to the second module.

The step of obtaining the card body comprises a sub-step of hot lamination of the upper layer, the first substrate, the intermediate layer and the lower layer.

The method comprises a step of obtaining at least one hollowing-out in the card body from the cavity to the intermediate layer.

With the card according to the invention, the totality of the fingerprint module is housed in a same cavity. There is thus no need to provide an additional connection or cavity to make it possible to house this module.

The fingerprint module may be easily integrated in a conventional electronic card.

PRESENTATION OF THE FIGURES

Other characteristics, aims and advantages of the invention will become clear from the description that follows, which is purely illustrative and non-limiting, and which should be read with regard to the appended drawings in which.

In all of the figures similar elements bear identical references.

DETAILED DESCRIPTION OF THE INVENTION

Figure 1A:
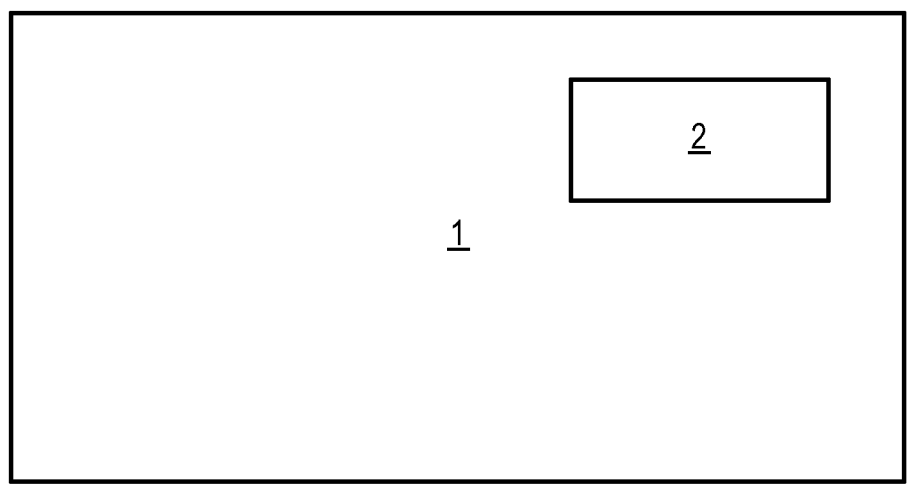
FIGS. 1a and 1b illustrate respectively a top view and a profile view of an electronic card according to one embodiment of the invention.
Figure 1B:
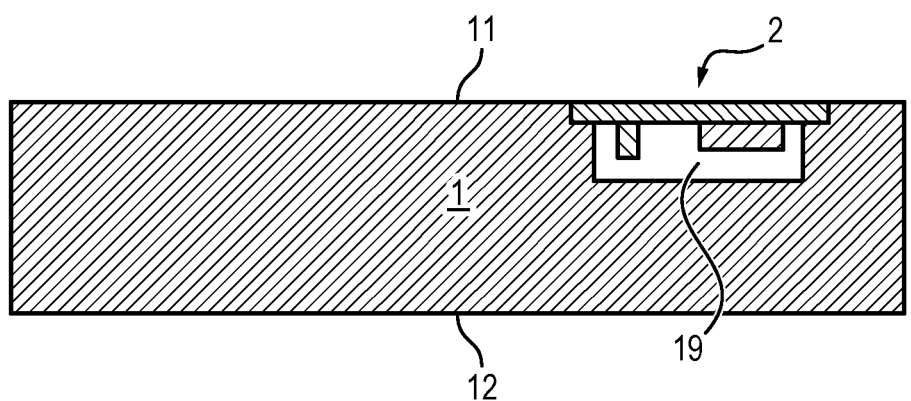

FIGS. 1a and 1b illustrate an electronic card comprising a card body 1 and a fingerprint module 2.

The card body 1 comprises an upper surface 11 and a lower surface 12 and has dimensions complying with the ISO 781 ID1 standard. In particular, the card body 1 has a thickness comprised between 780 and 840 μm.

Moreover, the card body comprises several layers assembled together by means of a hot lamination method so as to satisfy the constraints of binding the layers together of the ISO 781 ID1 standard.

The electronic card comprises a fingerprint module 2 housed in a cavity 13 formed in the thickness of the card body 1. The cavity 13 emerges from the upper surface 11 of the card body 1 and is flush with the upper surface of the card body. The cavity 13 is advantageously obtained by milling of the card body 1 over a desired thickness.

The fingerprint module 2 is configured to acquire the image of a fingerprint of a user and to check the identity of the bearer of the electronic card.

The module 2 comprises a flexible semiconductor substrate 22 typically made of polymer and epoxy material in order to be compatible with the flexibility constraints of the cited standard while being sufficiently sturdy.

A part of this substrate 22 constitutes the active part 21 of the module on which the bearer is going to lay his finger so that the image of his fingerprint is acquired.

The remainder of the substrate 22 enables the assembly of the fingerprint module 2 on the card and support for the assembly of a microcontroller 23 (configured to compare a freshly acquired fingerprint with a reference fingerprint) and potentially a memory 24 (which may comprise a reference fingerprint of the user stored beforehand).

Thus, the microcontroller is configured to implement the acquisition of the fingerprint as well as the processing of said fingerprint. In particular, the image of the fingerprint is captured by the active part then processed by the microcontroller so as to extract a model that will serve for the comparison with the image that the bearer will have recorded in the card during a preceding enrolment phase.

The fingerprint module thus comprises a substrate 2 comprising an active face 221 and a connection face 222 opposite to the active face 221. The active face 221 is the part of the fingerprint module which is flush with the upper surface of the card body 1 and which comprises the active part 21.

For example, for a fingerprint module 2 of a thickness of 600 micrometres, the active face 221 may be flush with the upper surface 11 of the card body 1 with a tolerance of around 100 micrometres, preferably around 50 micrometres.

Such a tolerance makes it possible to respect the constraints of introducing the card with its module 2 into an automatic cash dispenser type terminal, whereas a fingerprint module 2 that would be more raised with respect to the upper surface 11 would lead to difficulties, or even an impossibility, of introducing the card.

Such a tolerance also makes it possible to end up with satisfactory structural strength and facility of manufacturing the card, whereas a fingerprint module 2 positioned lower in the thickness of the card would weaken the structure thereof and would complicate the large scale manufacture thereof.

Furthermore, the lifetime of a card of which the module 2 would be situated lower in the thickness of the card would also be reduced by the accumulation of impurities and dust in the interstice between the upper surface 11 and the fingerprint module 2, which would damage the device over time.

Finally, a fingerprint module 2 that would be situated in a recess with respect to the upper surface 11 could lead to an unpleasant sensation of constraint for a user placing his finger on the recessed active face 221. Consequently, a module 2 flush with the upper surface 11 of the card will be more easily adopted by users.

Advantageously, the microcontroller 23 and potentially the memory are assembled to the substrate 2 typically by cold anisotropic bonding or re-melting at the level of the connection face 222.

The connection face 222 is the part of the fingerprint module that is in the cavity 13 formed in the card body 1 and comprises connection pads 25 which enable the connection of the fingerprint module to an antenna or to another module. We will return to this later.

Figure 2:
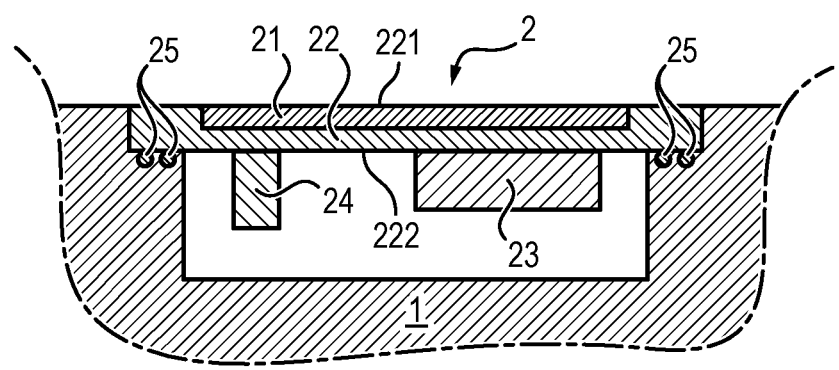
FIG. 2 illustrates a profile view of a fingerprint module of an electronic card according to one embodiment of the invention.

It will be noted that in FIG. 2 four connection pads are illustrated. However, a different number may be provided as a function of the required connections.

These connection pads 25 are arranged around the substrate 2 so as to waste the least possible space for the active part 21 and the mounting of the components. Nevertheless, no connection line and no component must be located at less than 0.3 mm from these pads so as to guarantee correct mounting of the module on the card. In addition, a reinforcement on the contour of the substrate is advantageously provided to avoid a too great flexibility on this part serving in the assembly. This reinforcement may be a crown of conductor material inside the substrate.

The maximum height of the substrate and the components must be 600 µm so as to be able to be integrated in the card without damage and while guaranteeing a sufficient background to ensure compliance with the flexibility and robustness requirements of the ISO 781 ID1 standard.

As already mentioned, the substrate 22 of the fingerprint module 2 is flexible. Also, to avoid that the substrate 22, under the effect of deformations generated by the finger of the user, deteriorates, once assembled in the card, a cavity 13 is advantageously provided having a three-dimensional inner profile in that it substantially hugs the profile of the connected elements projecting from the connection face 212 of the substrate 22 of the fingerprint module 2.

Figure 3:
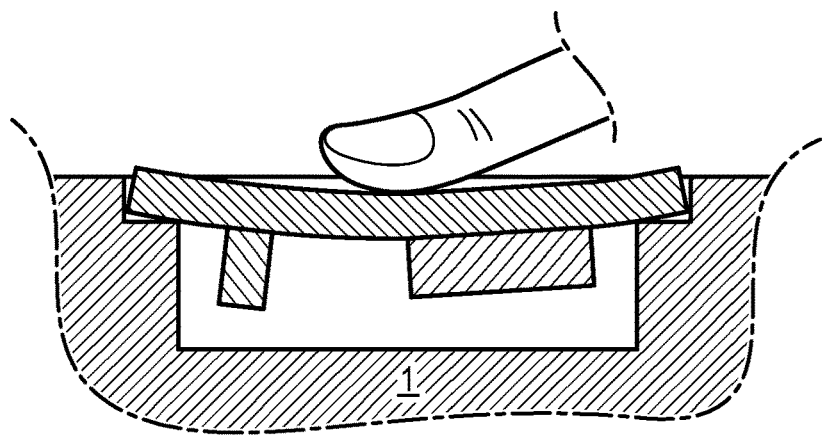
FIG. 3 illustrates a profile view of a fingerprint module of an electronic card according to one embodiment of the invention, subjected to a deformation introduced by a finger of a user.
Figure 4:
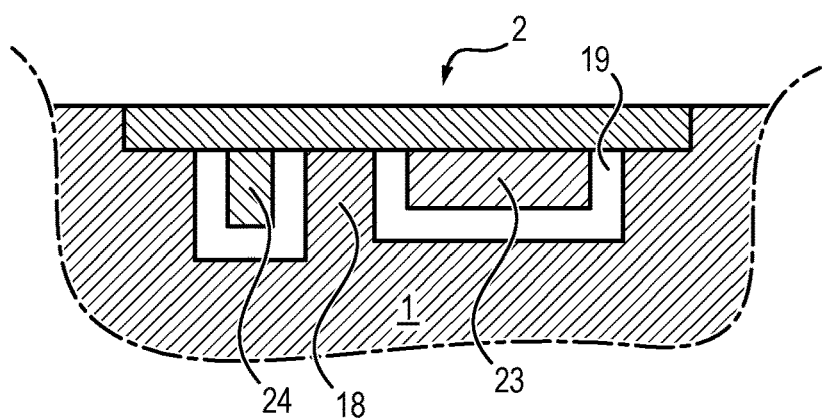
FIG. 4 illustrates a profile view of a fingerprint module in a three-dimensional cavity of an electronic card according to one embodiment of the invention.

In FIG. 2, the cavity is designated "standard" without particular profile. In FIG. 3, a cavity is shown with the fingerprint module deforming when a finger of a user is laid on the active part of the fingerprint module and in FIG. 4 a cavity having a three-dimensional profile is shown.

Figure 5:
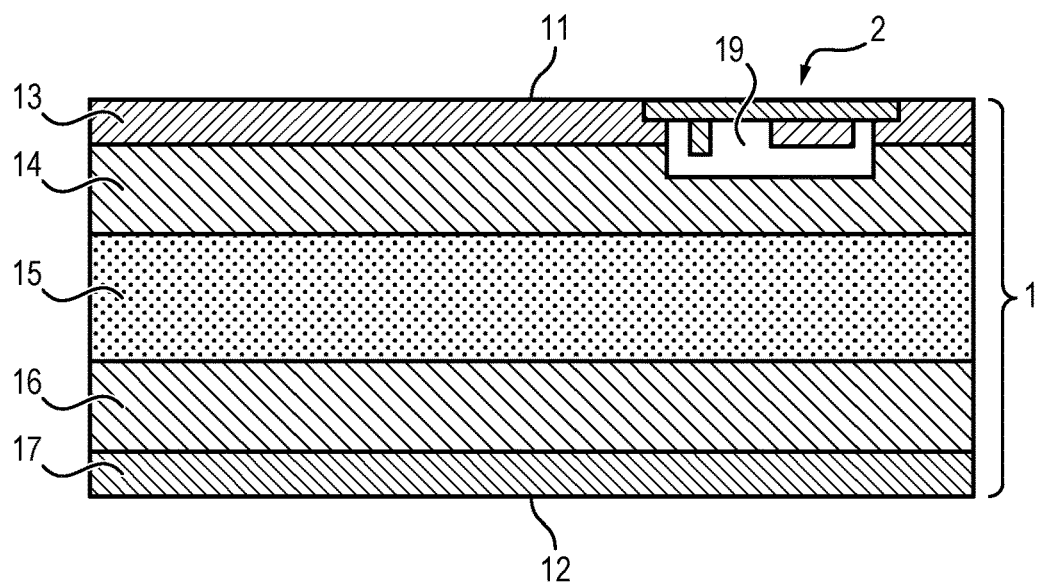
FIG. 5 illustrates a profile view of a card body of an electronic card according to one embodiment of the invention.

The components 23, 24 are directly mounted below the substrate 2 on the connection face and participate in the limitation of deformations. In addition, since the three-dimensional inner profile of the cavity substantially hugs the shape of the fingerprint module 2, this makes it possible to have one or more stop(s) 18 which will make it possible to limit deformations of the substrate 22 of the fingerprint module 2. In relation with FIG. 5, the card body comprises the following stack from the upper surface 11 of the card body to the lower surface 12 of the card body 1:
  a transparent protective upper layer 13 made of plastic material;
  a first substrate 14 made of plastic material;
  an intermediate layer 15 comprising a conductor material based on copper;
  a second substrate 16 made of plastic material;
  a transparent protective lower layer 17 made of plastic material.

The plastic layers are for example made of PVC or PC or PET.

The plastic layers are provided to support potential inscriptions (client visual, various decorations, identity, etc.) and the protective layers are provided to protect the plastic layers and to receive personalisation information of the bearer of the card.

The intermediate layer 15 is provided to support potential conductive tracks to connect the fingerprint module to an antenna or to another module. This aspect will be detailed hereafter.

Figure 6:
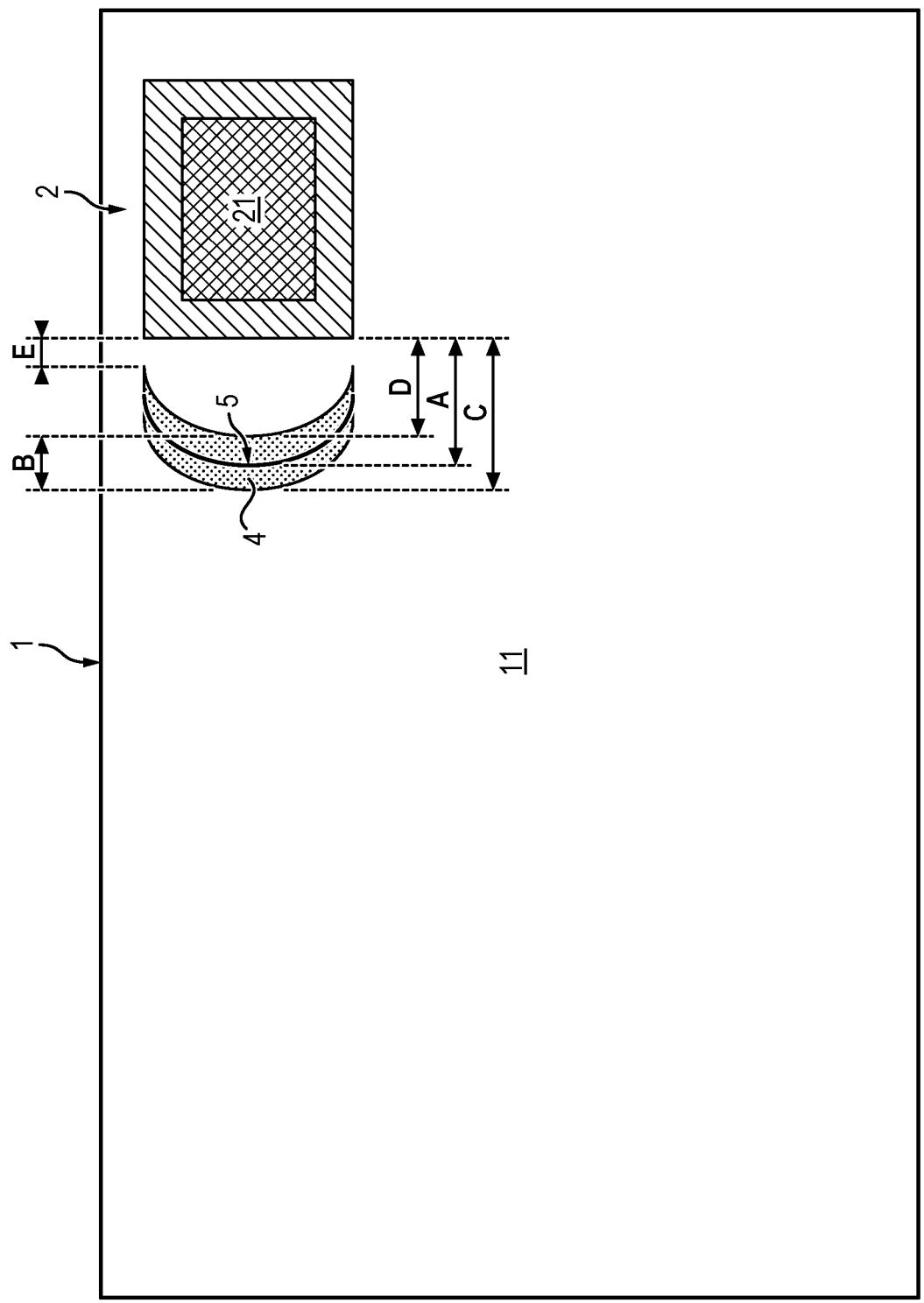
FIG. 6 illustrates a top view of an electronic card comprising a tactile mark according to one embodiment of the invention.

Advantageously, in relation with FIG. 6, on the upper face 11 of the card body, the transparent protective upper layer 13 comprises a tactile mark 4 which is added by means of printing of a tactile varnish, or by engraving of the transparent protective upper layer 13. This tactile mark is put in place in the immediate vicinity of the fingerprint sensor 21 (and thus the fingerprint module 2) so as to guide the user when he lays his finger on the fingerprint sensor 21. The tactile mark 4 makes it possible to facilitate the acquisition of the fingerprint.

In particular, the tactile mark 4 is such that when a user lays his finger, the fingerprint to acquire is correctly positioned on the fingerprint sensor 21.

The tactile mark 4 is advantageously printed by screen printing of a tactile varnish or engraved during the lamination of the layers together (through engraved plates) or instead engraved by laser. It has a maximum thickness of 50 µm in order to be compatible with the size constraints of the ISO 781 ID1 standard.

For a rectangular fingerprint module having a width between 15 mm and 18 mm, the tactile mark is situated at a maximum distance of 8-12 mm from the active part, preferably 10 mm.

The shape of the tactile mark is preferably half-moon shaped (see FIG. 6). Other shapes may be envisaged.

This tactile mark 4 has a pattern of which the roughness is different to that of the surface supporting the mark.

In an alternative or complementary manner, an alignment mark 5 making it possible, if need be, to indicate to the user where to position his finger on the card body is printed on the first substrate 14 and protected by the transparent protective upper layer 13. The alignment mark 5 is typically a portion of circle representing the end of a finger.

Figure 7:
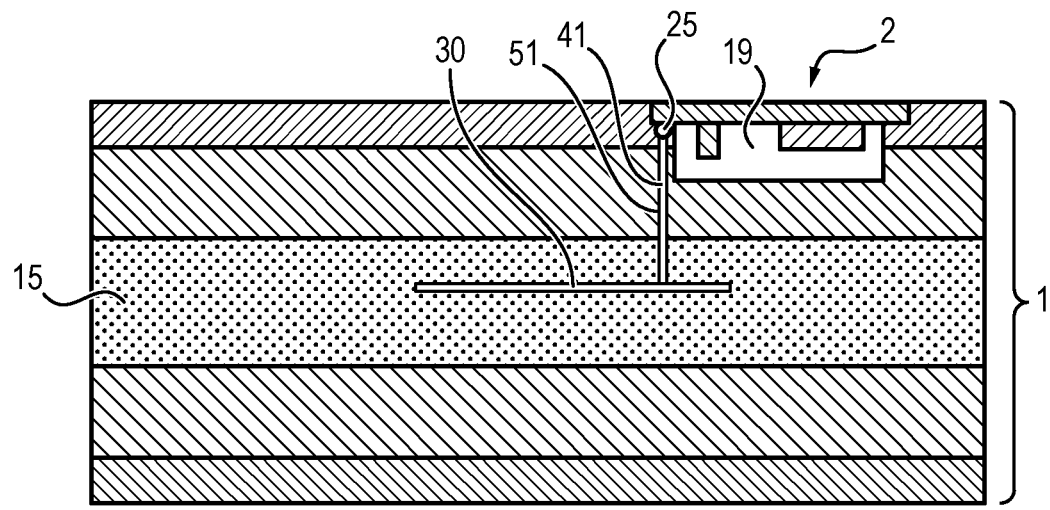
FIG. 7 illustrates a profile view of an electronic card according to one embodiment of the invention for a fingerprint sensor application.

According to one embodiment, illustrated in FIG. 7, the electronic card is used for the purposes of operation by contactless interface (by short or medium range radiofrequency via an antenna). The authentication of the bearer and the validation of his identity could trigger, by contactless mode, an access, a payment or other. The power supply of the card takes place via a contactless terminal which communicates with the card. This terminal depending on the applications is an access reader, a payment terminal or other.

In this respect, an antenna 30 connected to the fingerprint module 2 is provided. The antenna 30 is placed on the intermediate layer and laminated in the card body 1. At least one connection pad 25 is then connected to the antenna 30 by an electrical connection process via a conductive resin or other. To enable the connection of the fingerprint module 2 to the antenna 30 at least one cavity 41 arranged in the card body 1 is provided which is filled for example with a conductive resin 51 or other.

According to one so-called "contactless" operation, a contactless terminal communicates with the card and contains an antenna. This terminal is supplied with power and thanks to the passage of an alternating current in its antenna, the terminal generates an alternating magnetic field. Thanks to its antenna, the card near to this alternating field can extract its energy. Moreover, the alternating current of the terminal is modulated at two different frequencies, which makes it possible to transmit data at the same time as energy. Thus, receiving its energy, the card is going to demodulate the signal and recover at the same time the data modulated and transmitted by the terminal.

A contactless operation has been described but the card described here applies to other operations, such as:
- with contact (via a conventional interface module in compliance with the ISO 7816-2 standard);
- or "dual" that is to say with the two supply means (contact or contactless);

The communication protocol between terminal and card is standardised so as to guarantee interoperability. Such standards are for example the ISO 14443 and ISO 15693 standards.

Figure 8:
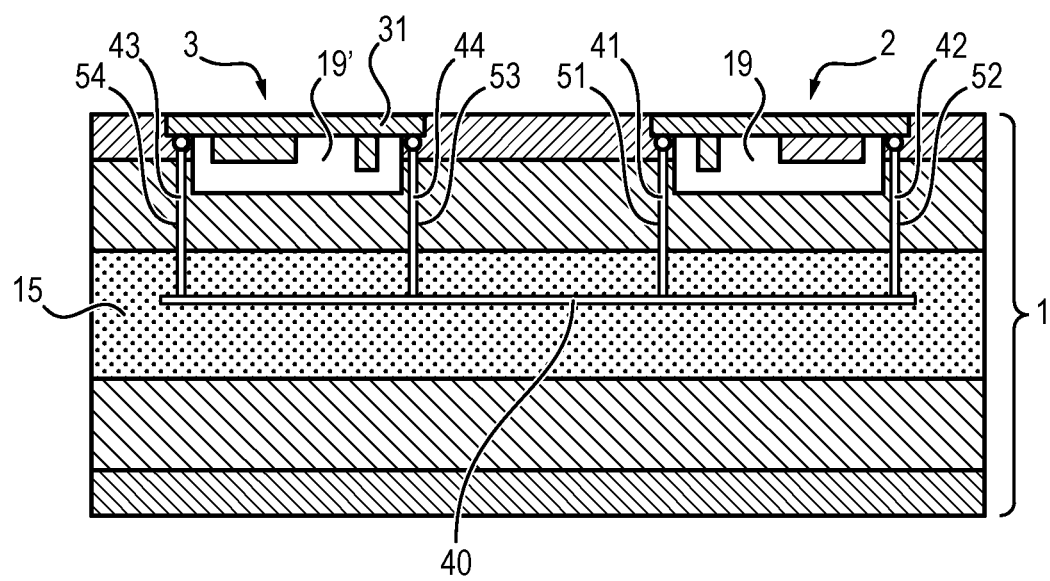
FIG. 8 illustrates a profile view of an electronic card according to one embodiment for a fingerprint sensor application coupled with another application.

In relation with FIG. 8, the electronic card comprises, apart from a fingerprint module 2, a second module 3 comprising a chip configured to operate functions moreover known to those skilled in the art such as a function of controlling access to a place and/or a transport network and/or a function of sovereign identification of individuals and/or a payment function.

According to this embodiment, the authentication of the bearer of the card and the validation of his identity could trigger, by contact or contactless mode, an access, a payment or other.

Still in relation with FIG. 8, the card thus comprises a second module 3 housed in a dedicated cavity 13'.

The second module 3 is connected to the fingerprint module 2 via a circuit 40 placed on the intermediate layer. The module 3 comprises a microcontroller (chip) 31.

The fingerprint module 2 and the second module 3 are connected to the circuit via hollowing-outs 41, 42, 43, 44 arranged in the body and filled for example with conductive resin 51 or other. In FIG. 8, four hollowing-outs are illustrated but it will be understood that there are as many hollowing-outs as necessary.

Figure 9:
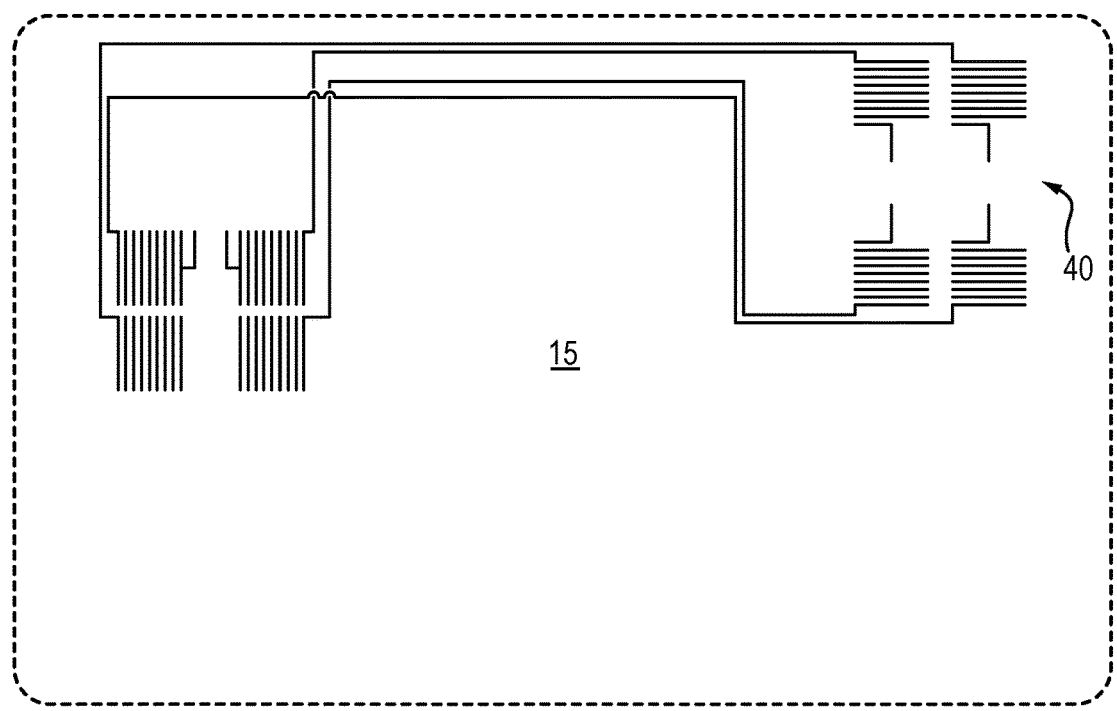
FIG. 9 illustrates a top view of an interconnection layer of the electronic card of FIG. 8.

FIG. 9 illustrates a detailed view of the interconnection layer of the electronic card of FIG. 8.

In this figure may be seen four connections to connect the fingerprint module 2 to the payment module 3. Obviously, the number and the arrangement of the connections could vary as a function of the type of connection circuit.

In a complementary manner, the second module 3 can interface according to the contact and contactless modes (known as DUAL mode operation). From the moment that a contactless mode is necessary, an antenna (not represented in FIG. 8), is placed on the interconnection layer or is added directly to the second module 3.

Figure 10:
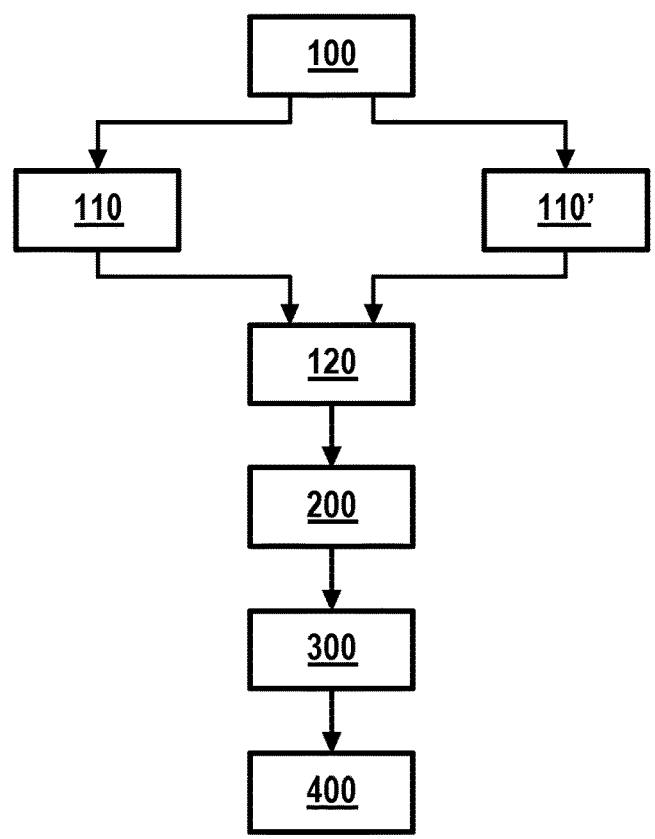
FIG. 10 illustrates the steps of a method of manufacturing an electronic card according to the invention.

The electronic card described above is advantageously manufactured by means of a method described in relation with FIG. 10.

The manufacturing method essentially comprises the following steps:
- obtaining 100 a card body;
- forming 300 at least one cavity 13, 13' in the card body 1;
- placing 400 the fingerprint module 2 in the cavity.

Depending on the application of the electronic card, obtaining the card body 1 comprises:
- a sub-step 110 of integrating an antenna 30 on the intermediate layer; and/or
- a sub-step 110' of integrating a connection circuit making it possible to connect the fingerprint module to the second module 3.

The integration of the antenna and/or the connection circuit is implemented by means of a specific layer assembled with the other layers of the card body.

Advantageously, the card body 1 is obtained (step 120) by means of a method of lamination of the different layers constituting the card body 1: protective layers, layers on which is printed the visual of the card including the alignment mark and the lower interconnection layer which can bear the antenna for a so-called contactless or DUAL operating mode.

The parameters of this method are dependent on the materials used but can vary from temperatures below 100° C. for several seconds to temperatures of more than 180° C. for 20 minutes at different pressures. The aim of the operation is to obtain a homogenous structure with an adhesion of the different layers between each other in compliance with the ISO 781 ID1 standard. During this method, the tactile mark may be generated by using lamination plates engraved beforehand.

If this is not the case during the lamination, in a complementary manner, a step of printing the tactile mark is implemented. The layers laminated together are then printed using a tactile varnish. The method used is that of screen printing in order to obtain a sufficient thickness to obtain a touch while remaining within a thickness in compliance with the standard (50 µm). Depending on the visual printed on the card, it may also be envisaged to add this tactile mark by engraving using a laser. Dark visuals will be preferred to light visuals to use this technology marking the material from dark marks.

Moreover, before placing the module(s) in the cavities formed, the method comprises a step 200 of obtaining at least one hollowing-out in the card body from the cavity to the intermediate layer. The hollowing-out(s) make it possible to carry out the necessary connections from the module(s) to the interconnection layer.

The invention claimed is:

1. Flexible electronic card comprising:
   a card body (1) comprising an upper surface (11) and a lower surface (12);
   at least one cavity (13, 13') formed in the card body emerging from the upper surface;
   a fingerprint module (2) configured to acquire a fingerprint of a user, the fingerprint module being housed in the cavity (13) and flush with the upper surface of the card body; the fingerprint module (2) comprising a flexible substrate (22) flushing with the upper surface and comprising an active part (21), designated capture part, flush with the upper surface of the card body and a microcontroller (23) arranged below the substrate.

2. Electronic card according to claim 1, in which the fingerprint module (2) further comprises connection pads intended to connect said fingerprint module to an antenna (30) or to a second module (3).

3. Electronic card according to claim 1, in which the cavity (13, 13') has a maximum depth such that the distance between the lower surface of the card body and the bottom of the cavity is at least 160 µm.

4. Electronic card according to claim 1, in which the cavity (13, 13') has a three-dimensional inner profile so as to follow the inner contour of the fingerprint module (2), the cavity comprising at least one stop configured to limit deformations of the module housed in the cavity.

5. Electronic card according to claim 1, comprising two cavities (13, 13'), one cavity housing the fingerprint module, the other cavity housing a second module (3), typically bank or access.

6. Electronic card according to claim 1, in which the card body (1) comprises an intermediate layer, designated interconnection layer, made of conductor material on which an antenna is integrated.

7. Electronic card according to claim 5, in which the card body (1) comprises an intermediate layer, designated interconnection layer, made of semiconductor material on which a circuit, configured to connect the fingerprint module to the second module (3).

8. Electronic card according to claim 7, comprising hollowing-outs formed from the at least one cavity to the interconnection layer.

9. Electronic card according to claim 1, in which the card body comprises from the upper surface to the lower surface the following laminated layers:
- a transparent protective upper layer (13);
- a first substrate (14) made of PVC;
- the intermediate layer (15), designated interconnection layer;
- a second substrate (16) made of PVC;
- a transparent protective lower layer (17).

10. Electronic card according to claim 1, further comprising a tactile mark (4) and/or an alignment mark (5) arranged on the upper surface of the card body near to the fingerprint module (2), said tactile mark being configured to enable correct positioning of a finger on the fingerprint module (2).

11. Method of manufacturing an electronic card according to claim 1, comprising the steps of:
- obtaining (100) a card body;
- forming (300) at least one cavity (13, 13') in said card body;
- placing (400) a fingerprint module (2) in the cavity, the fingerprint module (2) comprising a flexible substrate (22) comprising an active part (21), designated capture part, flush with the upper surface of the card body and a microcontroller (23) arranged below the substrate.

12. Manufacturing method according to claim 11, in which the step of obtaining the card body comprises a sub-step (110) of integrating an antenna on the intermediate layer (15).

13. Manufacturing method according to claim 11, comprising obtaining (200) two cavities in the card body (1), and placing (400) the fingerprint module in one of the two cavities and placing a second module (3) in the other cavity, the step of obtaining (100) the card body (1) further comprises a step of integrating (110') a connection circuit (40) configured to connect the fingerprint module (2) to the second module (3).

14. Manufacturing method according to claim 11, in which the step (100) of obtaining the card body (1) comprises a sub-step (110) of hot lamination of the upper layer (13), the first substrate (14), the intermediate layer (15) and the lower layer (17).

15. Manufacturing method according to claim 11, comprising a step (200) of obtaining at least one hollowing-out in the card body from the cavity to the intermediate layer.

* * * * *